HAROLD K. JORDAN
CAREY W. McCACHERN, JR.
INVENTORS.

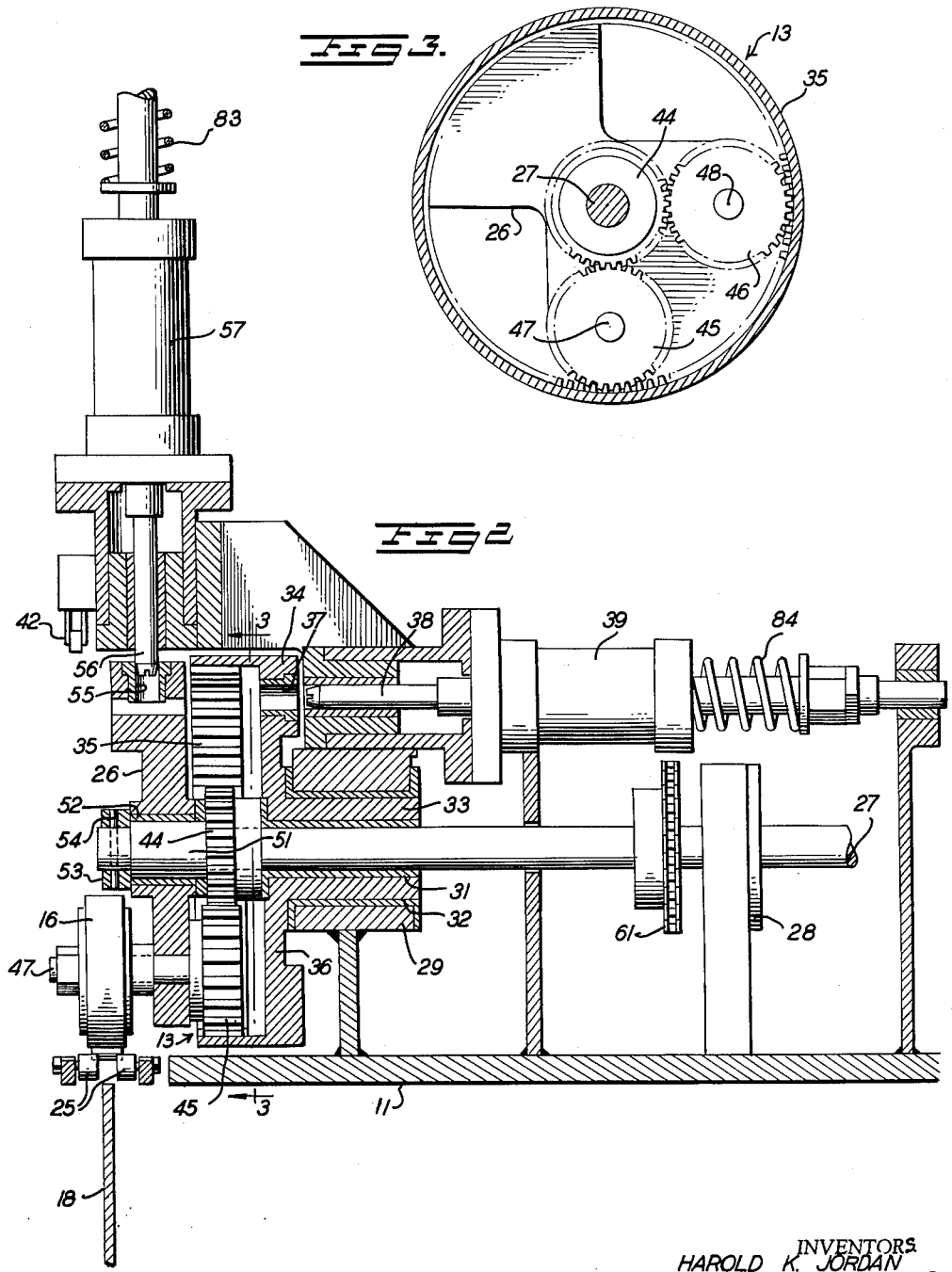

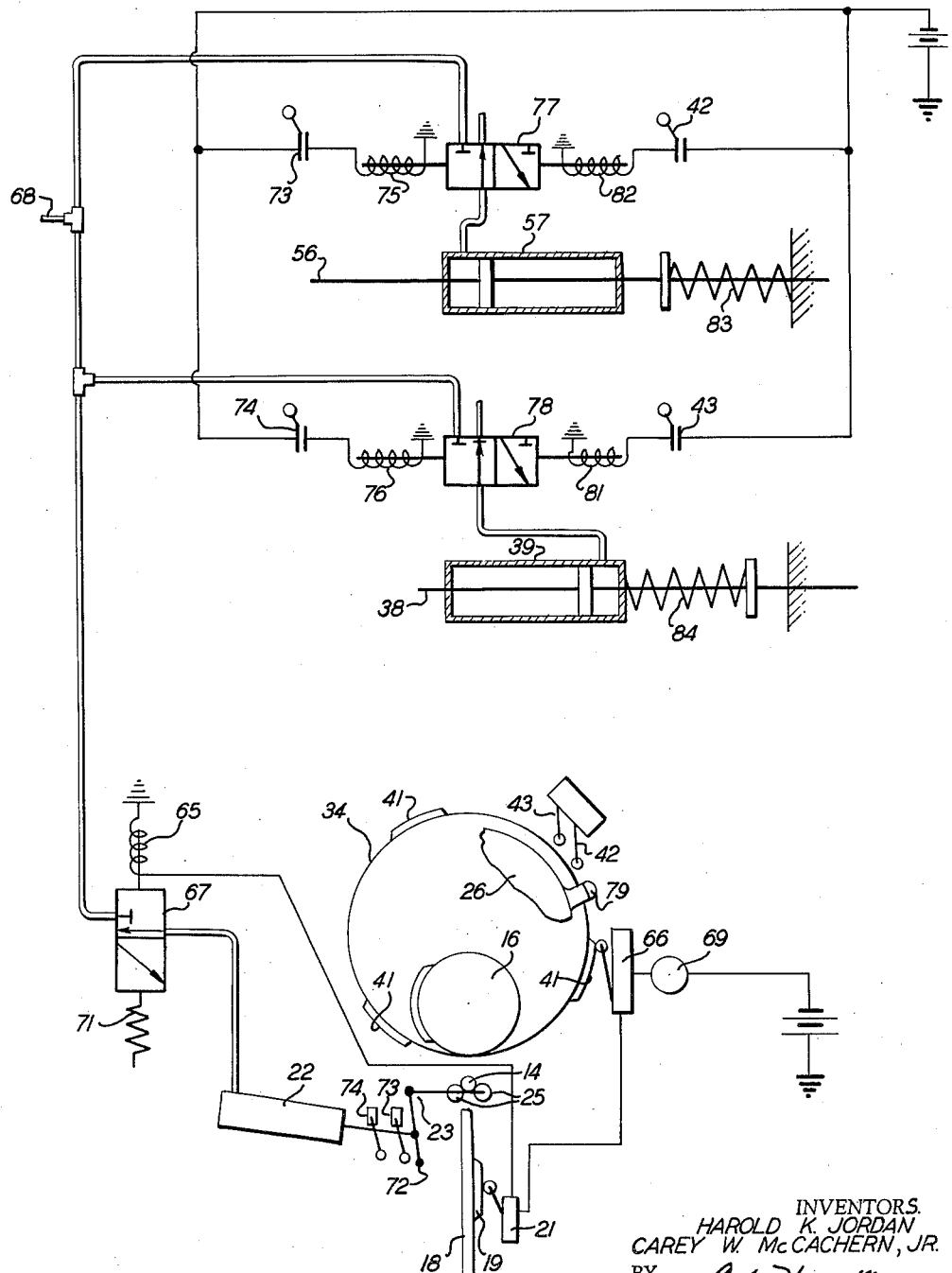

INVENTORS.
HAROLD K. JORDAN
CAREY W. McCACHERN, JR.
BY *C. B. Hamilton*

ATTORNEY

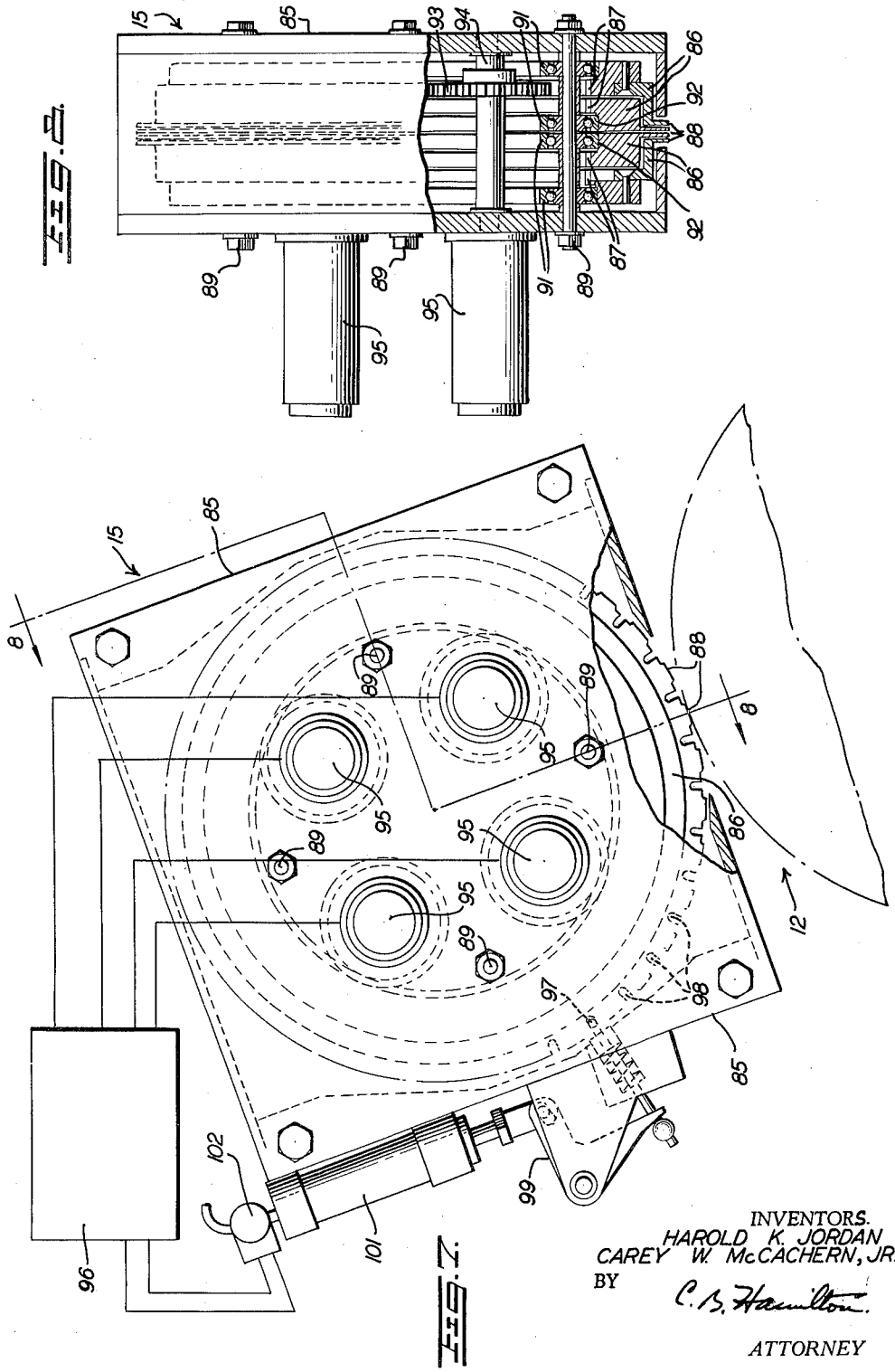

3,045,588
APPARATUS FOR MARKING ARTICLES
Harold K. Jordan and Carey W. McCachern, Jr., Winston-Salem, N.C., assignors to Western Electric Company, Incorporated, New York, N.Y., a corporation of New York
Filed Mar. 25, 1959, Ser. No. 801,822
11 Claims. (Cl. 101—38)

This invention relates to apparatus for marking articles and more particularly to apparatus for offset printing deposited carbon resistors by means of a printing roll actuated by a planetary gear system.

In the manufacture of components such as deposited carbon resistors it is necessary to mark the completed product to indicate the important electrical characteristics thereof. Known marking has been done manually with resulting high cost and poor results which characterize manual operations.

An object of the invention is to provide printing apparatus for marking articles.

Another object of the invention is to provide computer-controlled printing apparatus for marking electrical components.

Still another object of the invention is to provide computer-controlled apparatus utilizing a planetary gear system for marking electrical components.

Apparatus illustrating certain features of this invention includes an ink supply means, printing type, and means for transferring ink from the supply means to the type in a predetermined path. Printing means are mounted upon a common support with the transfer means and receive an inked impression from the printing type for subsequently marking an article.

More particularly, apparatus illustrating certain features of this invention includes a movable cradle on which is positioned an article to be marked. A printing roll mounted on a carrier plate transfers an inked impression to the article from a plurality of pre-indexed type wheels. The carrier plate and a ring gear, which form a portion of a planetary gear system, are alternately locked in a stationary position to move the printing roll into engagement with the type wheels and thence to the electrical component to print desired information thereon.

Other objects and advantages of the invention will become apparent by reference to the following detailed description and the accompanying drawings illustrating a preferred embodiment of the invention, in which:

FIG. 2 is a view partly in section taken on line 2—2 of FIG. 1;

FIG. 3 is a cross-sectional view taken on line 3—3 of FIG. 2;

FIG. 4 is a schematic of a control system for the printing device of FIG. 1;

FIG. 7 is a side elevational view of the type wheel shown in FIG. 1; and

FIG. 8 is a front view of the type wheel partly broken away and taken on line 8—8 of FIG. 7.

Figure 1:
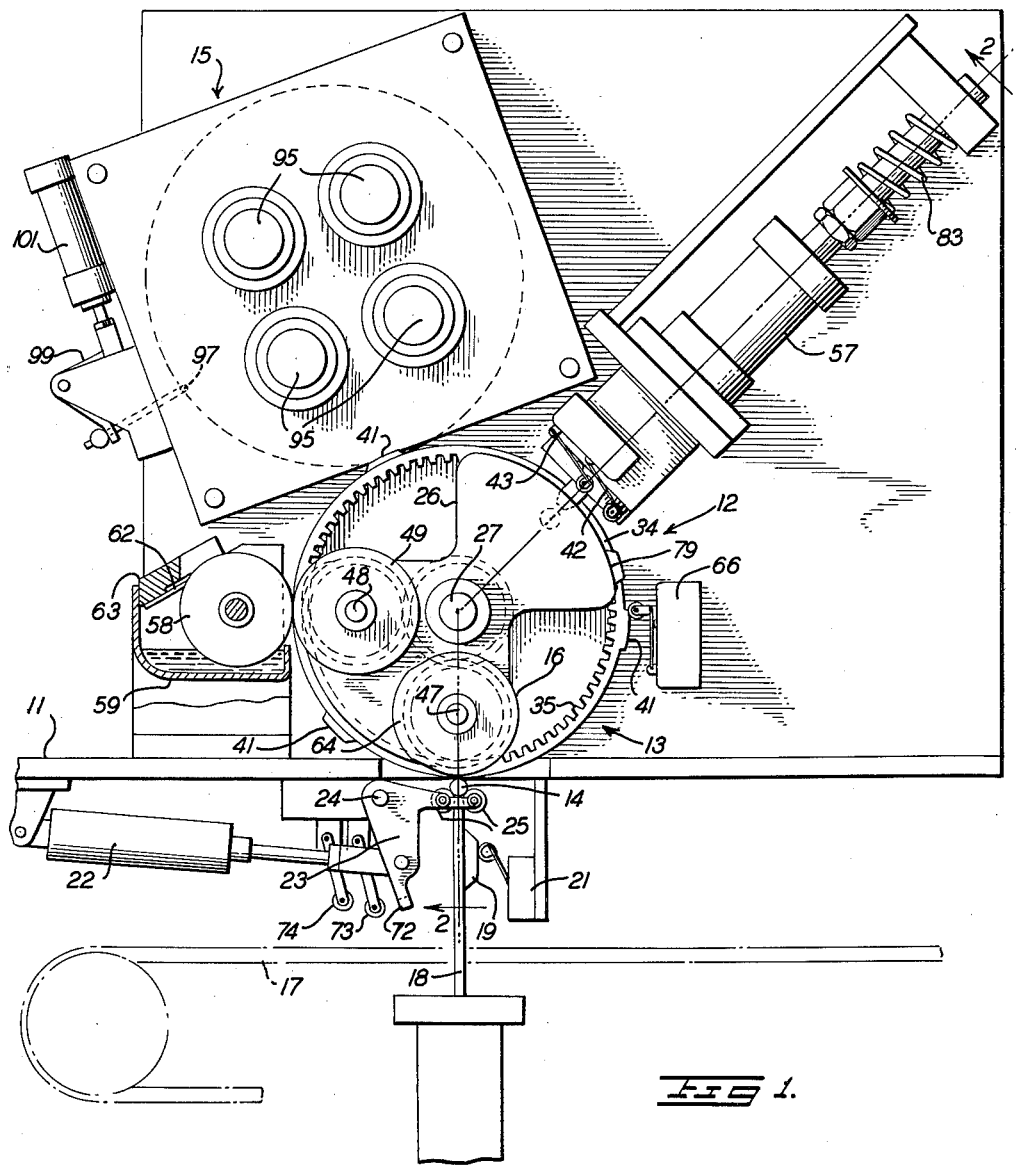
FIG. 1 is a front elevational view of an offset printing apparatus embodying the invention.

Referring to the drawings, FIG. 1 shows a base 11 supporting a printing device 12, which employs a planetary gear system 13, for marking an article such as a deposited carbon resistor 14. At a point on the periphery of the printing device 12 is a mark impressing device, such as a type mechanism 15, from which a marking impression is conveyed to the resistor 14 by a rotary transfer or printing roll 16 actuated by the planetary gear system 13.

Resistors 14 are supplied to the printing device 12 by a conveyor 17 co-operating with a vertically reciprocated push rod 18. Upon elevation of a resistor 14 by the push rod 18, a cam 19 thereon activates a microswitch 21 which is secured to the base 11. A pneumatic cylinder 22, actuated by the closing of the microswitch 21, pivots a bell crank 23 about a pin 24 in a counterclockwise direction thereby raising a plurality of cradle rollers 25 which are attached to the bell crank. As the cradle rollers are moved past the push rod 18, the resistor 14 thereon is transferred to the rollers and subsequently carried into a printing position beneath the printing device 12, as shown in FIG. 1.

While the resistor is in this position it is marked by the printing roll 16 which is rotatably mounted on a movable carrier plate 26. Rotation of the printing roll 16 in relation to the carrier plate 26 is accomplished by the planetary gear system 13 actuated by a driven shaft 27. As shown in FIG. 2, the driven shaft, rotated by means not shown, is positioned upon the base 11 by upright holding fixtures 28 and 29. Within the holding fixture 29 between bushings 31 and 32 is slidably positioned a cylindrical sleeve 33 integral with a rotatable ring gear 34 which forms a portion of a planetary gear system 13. The ring gear 34 also includes an internally toothed ring 35 and a circular web portion 36 between the ring 35 and the sleeve 33. Within the web portion 36 is an aperture 37 into which a locking pin 38 is moved by a pneumatic cylinder 39 to hold the ring gear 34 stationary with respect to the base 11. Three angularly displaced cams 41 (FIG. 1) are secured to the outer periphery of the internally toothed ring 35 and co-operate with microswitches 42 and 43 to control the operation of the printing device 12.

As shown in FIG. 2, the sun gear 44 keyed to the driven shaft 27 within the internally toothed ring 35 is in driving engagement with planetary gears 45 and 46 (FIG. 3) which are rotatably mounted on the carrier plate 26 by stub shafts 47 and 48, respectively. Also secured to the stub shaft 47 is the printing roll 16, and a marking material conveying member such as an ink roll 49 (FIG. 1) is similarly secured to the stub shaft 48. The carrier plate 26 to which the stub shafts 47 and 48 are secured is slidably supported upon an enlarged portion 51 of the driven shaft 27 through a bearing 52 and retained thereon by a locking sleeve 53 secured to the driven shaft 27 by a locking pin 54.

The carrier plate 26 also has an aperture 55 at a point on the outer periphery thereof which is similar in purpose, size, and shape to the aperture 37 in the ring gear 34. A reciprocal locking pin 56 is intermittently moved into the aperture 55 by a pneumatic cylinder 57 to lock the carrier plate 26 from motion with respect to the base 11. When the locking pin 38 is extended into the aperture 37 of the ring gear, the carrier plate 26 is unlocked and is rotated by the sun gear 44 by means of the planetary gears 45 and 46. Such rotation moves both the inking roll 49 and the printing roll 16 in a circular path past an inking cylinder 58 and the type mechanism 15. Conversely, when the carrier plate 26 is locked by the pin 56 and the ring gear 34 is released by the pin 38, the printing roll 16 and inking roll 49 are rotated with respect to the carrier plate 26 by means of the planetary gears 45 and 46, respectively, which are driven by the sun gear 44.

A source of transferable material such as ink for the printing device 12 includes a reservoir 59 in which the inking cylinder 58 is rotated. A sprocket 61 on the driven shaft 27 (FIG. 2) imparts rotation to the inking cylinder 58 by means of a chain drive (not shown). A doctor blade 62 fixed to a carrier block 63 on the reservoir 59 controls the amount of ink transferred to the inking cylinder 58. As the inking roll 49 and printing roll 16 are moved by the carrier plate 26 past the cylinder 58, the inking roll engages the cylinder to receive a coating of ink therefrom. Subsequently, the inking roll is moved into momentary engagement with the type mechanism whereby ink is transferred thereto.

Figure 6A:
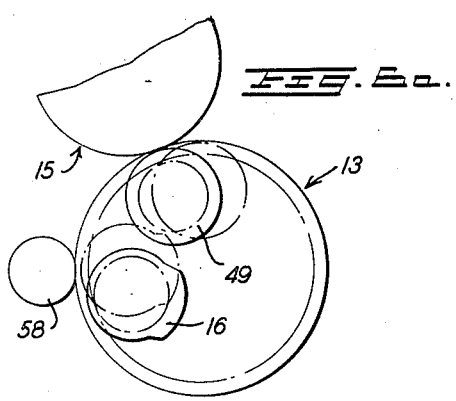
FIGS. 6a and 6b are schematic views of a portion of the offset printing mechanism showing the relative positions of the printing roller during movement of a carrier plate.
Figure 6B:
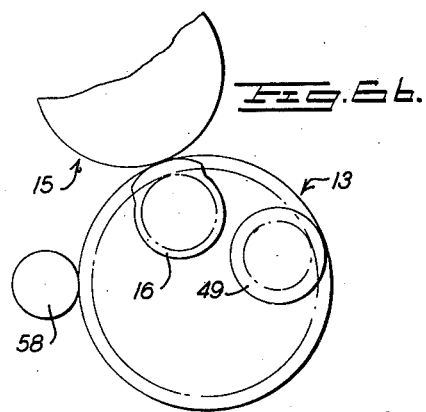

Because both the inking roll 49 and printing roll 16 are moved in the same circular path by the carrier plate 26, the printing roll would ordinarily engage the inking cylinder 58 and be smeared thereby. To preclude such smearing only a raised portion 64 of the printing roll 16 is of sufficient diameter to touch the inking cylinder 58 when the roll is moved past the inking cylinder. Also, the ring gear 34 and planetary gear 45 are so designed that this raised portion 64 is turned inwardly when the printing roll 16 is moved past the inking cylinder 58, as shown in FIGS. 6a and 6b. Subsequently, the raised portion 64 of the printing roll is moved into engagement with type mechanism 15 to receive an inked impression therefrom for transfer to the resistor 14.

After a cycle of printing is completed, the carrier plate 26 is in locked position and the ring gear 34 is free to rotate. As the resistor 14 is elevated to a position directly below the rotating printing roll, the cam 19 on the push rod 18 closes the switch 21 to establish a circuit to a solenoid 65 at such time as one of the cams 41, carried by the rotating ring gear 34, closes a switch 66. When the switch 66 is closed, a valve 67 is moved by the solenoid 65 to admit compressed air from a source 68 into the pneumatic cylinder 22. The cylinder 22 then elevates the cradle rollers 25 whereby a resistor 14 is removed from the push rod 18 and positioned for printing.

Figure 5A:
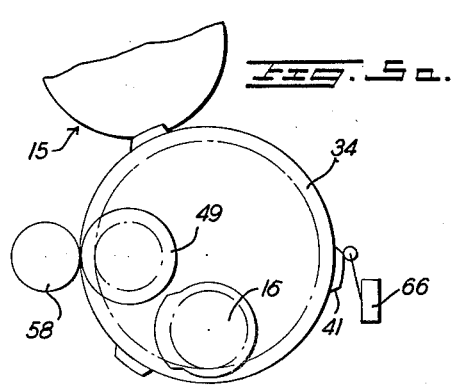
FIGS. 5a through 5d are a series of schematic views of a portion of the offset printing mechanism shown in FIG. 1 depicting the sequential positions of a ring gear and printing roll during a marking or printing operation.
Figure 5B:
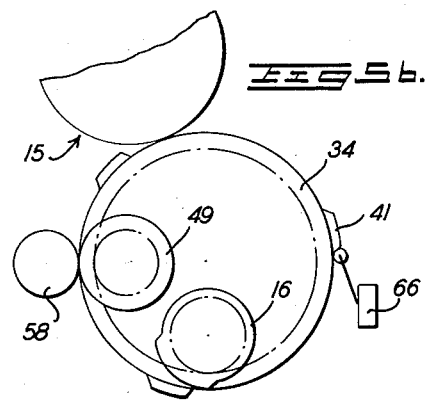
Figure 5C:
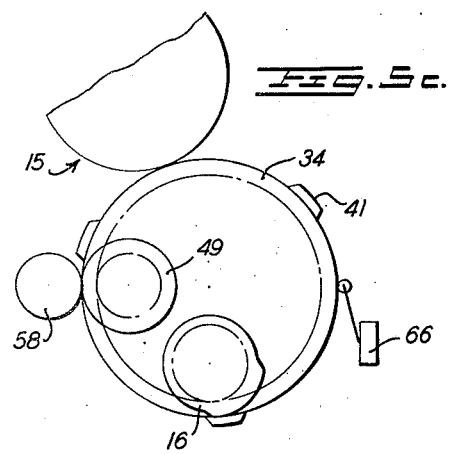
Figure 5D:
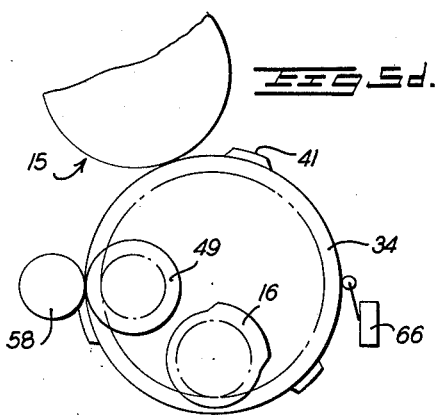

As shown in FIG. 5a, the printing roll 16 is in starting position for the printing operation when the switch 66 is closed by the cam 41. Continued motion of the ring gear 34 moves the cam 41 out of engagement with the switch 66 (FIG. 5b) whereupon a timer 69 retains the switch in a closed position until the printing roll 16 reaches the position shown in FIG. 5c. At this time the switch 66 is opened by the timer 69. Subsequently, the timer is deactivated when the cam 41 reaches the position shown in FIG. 5d. With the solenoid 65 deenergized by the opening of the switch 66, the valve 67 is moved by a spring 71 to exhaust the cylinder 22. Upon being exhausted, the cylinder 22 pivots the bell crank 23 clockwise to return the marked or printed resistor 14 to the push rod 18. As the bell crank 23 is moved, a cam finger 72 thereon momentarily closes a pair of one-way switches 73 and 74 in sequence. Upon closing, the switches 73 and 74 actuate solenoids 75 and 76, respectively, which move a pair of valves 77 and 78 to the left as viewed in FIG. 4. Compressed air is then transmitted from the source 68 to the pneumatic cylinders 57 and 39 to remove the pin 56 from the carrier plate 26 and simultaneously to lock the ring gear 34 by travel of the pin 38 into the aperture 37 in the ring gear.

With the carrier plate 26 unlocked and the ring gear 34 in a locked position, the inking roll 16 and printing roll 49 are moved past the inking cylinder 58 and the type mechanism 15 by the carrier plate 26. As the carrier plate nears completion of one revolution, a switch actuating arm 79 secured to the outer periphery thereof engages the switches 43 and 42 to actuate solenoids 81 and 82, respectively. Such actuation returns the valves 77 and 78 to the position as shown in FIG. 4 whereupon the cylinders 57 and 39 are exhausted, and the pins 56 and 38 are returned to their original positions by the action of springs 83 and 84, respectively. As the pin 38 is thus moved, it is withdrawn from the aperture 37 in the ring gear 34 to allow the ring gear to rotate about the driven shaft 27.

Conversely, movement of the pin 56 locks the carrier plate 26. Because the switch 43 was closed shortly prior to the switch 42, the ring gear 34 is unlatched shortly before the carrier plate 26 is locked. Thus any tendency of the ring gear 34 and carrier plate 26 to bind upon the driven shaft 27 is precluded. The device is now in condition to print the next resistor raised by the push rod 18.

The type mechanism 15 (FIGS. 7 and 8) includes a housing 85 in which four type wheels 86 are rotatably mounted. Each type wheel includes teeth 87 on an annular interior portion and printing type characters 88 on the outer periphery of the wheel. Secured to the housing 85 at right angles to the plane of the type wheel 86 are four parallel support shafts 89 on each of which are rotatably secured four spaced ball races 91. Corresponding races on each of the support shafts 89 are arranged in a plane with one of the type wheels 86. These races engage a wheel on an interior shoulder 92 such that the wheel is rotatably supported at four points by the ball races. For rotating the type wheels 86 on the ball races 91, the teeth 87 of each wheel are engaged by a spur gear 93 keyed to a drive shaft 94. Because each of the four type wheels must be rotated independently of the other three, four drive shafts 94 are mounted within the housing parallel to the support shafts 89. Four servomotors 95 are secured to a side of the housing 85, and each incrementally rotates one of the drive shafts 94 to position the type wheel 86 geared thereto.

By controlling the actuation of the servomotors 95 it is possible to position the type wheels 86 through the drive shafts 94 and spur gears 93 in any desired arrangement. To control the actuation of the servomotors a conventional computer 96 is electrically connected to the servomotors. Pertinent information concerning the resistors to be marked is fed to the computer by tape, punched card, etc., and the computer accordingly controls the rotation of the servomotors by suitable pulse signals. By such means the drive shafts 94 are moved in predetermined increments to index the type wheels 86.

After the type wheels 86 are indexed they are retained in their indexed position by a locking bar 97. The locking bar is reciprocated into and out of engagement with depressions 98 on the outer periphery of the type wheels 86 by a bell crank 99. A pneumatic cylinder 101, which moves the bell crank 99, is actuated from an air supply (not shown) through a solenoid valve 102. To actuate the bell crank 99 in timed relationship to the movement of the type wheels 86, the solenoid valve 102 is electrically connected to the computer 96 and is controlled thereby.

It is to be understood that the above described arrangement is but illustrative of the application of the principles of this invention. Numerous other arrangements may be readily devised by those skilled in the art which will embody the principles of the invention and fall within the spirit and scope thereof.

What is claimed is:

1. In an article printing mechanism, a source of ink, printing type, a driven shaft, a sun gear mounted on the shaft, a carrier plate rotatably mounted on the shaft, an inking roll mounted on the carrier plate for transferring ink from the ink source to the printing type, a first planetary gear rotatably mounted on the carrier plate in driving co-operation with the inking roll, a printing roll rotatably mounted on the carrier plate for transferring an inked impression from the printing type to an article, a second planetary gear rotatably mounted on the carrier plate in driving co-operation with the printing roll, both the first and the second planetary gears being in meshing engagement with the sun gear, an internally toothed ring gear mounted for rotation about the axis of the driven shaft and in meshing engagement with both the first and the second planetary gears, means for locking the ring gear to move the carrier plate with the inking roll and printing roll past the printing type whereby the inking roll inks the type and the printing roll receives an impression from the type, and means for locking the carrier plate when the printing roll is in position for marking an article.

2. A printing mechanism which comprises an ink source, a type mechanism including rotatable type wheels having type characters on the peripheries thereof, motive means connected to each wheel, a computer connected to and for energizing the motive means to rotate the type wheels predetermined amounts for setting up type to represent a multi-character mark, a driven shaft, a sun gear mounted on the shaft, a carrier plate mounted for rotation on the driven shaft, an inking roll mounted on the carrier plate for transferring ink from the ink source to the set up type, a first planetary gear rotatably mounted on the carrier plate in driving co-operation with the inking roll, a printing roll rotatably mounted on the carrier plate for transferring an inked impression from the set up type to an article, a second planetary gear rotatably mounted on the carrier plate in driving co-operation with the printing roll, both the first and the second planetary gears being in meshing engagement with the sun gear, an internally toothed ring gear mounted for rotation about the axis of the driven shaft and in meshing engagement with both the first and the second planetary gears, means for locking the ring gear to move the carrier plate with the inking roll and printing roll past the set up type whereby the inking roll inks the set up type and the printing roll receives an impression from the set up type, and means for locking the carrier plate when the printing roll is in position for marking an article.

3. An article printing mechanism which comprises a frame, a source of ink mounted on said frame, printing type secured to said frame, a carrier plate movably mounted on said frame, an ink roll secured to said plate, a printing roll secured to said plate, a ring gear, driven planetary gear means secured to said plate in meshing engagement with said ring gear for rotating said rolls and intermittently driving said ring gear and said plate, and means for alternately locking said ring gear and said carrier plate from motion whereby said ink roll and printing roll are moved with respect to said printing type and an article to be printed.

4. An article printing mechanism which comprises type characters, means for elevating an article to be printed, means responsive to the motion of said elevating means for positioning said article for subsequent printing, a carrier plate, a printing roll mounted on said carrier plate for movement thereby into a position for printing said article, planetary gear means in driving engagement wth said carrier plate for rotating said printing roll, first means for locking said carrier plate in printing position, second means for locking a portion of said planetary gear means, means responsive to motion of said portion of said planetary gear means for actuating said first and second locking means whereby said portion is locked and said plate is unlocked to move said printing roll into engagement with said type characters, and means responsive to the motion of said carrier plate for actuating said first and second locking means to unlock said portion and lock said carrier plate in the printing position.

5. An article printing mechanism which comprises type characters, a pushrod for elevating an article to be printed, cradle means responsive to the elevation of an article by the pushrod for supporting said article in a position for subsequent printing, a carrier plate, a printing roll mounted on said carrier plate for movement thereby into a position for printing said article on said cradle means, a driven planetary gear mounted on said plate for rotating said printing roll, a ring gear in meshing engagement with said planetary gear, first means for locking said carrier plate with said printing roll in position to engage said article, second means for locking said ring gear, switch means responsive to the motion of said ring gear for actuating said first and second locking means whereby said ring gear is locked and said plate is unlocked to move said printing roll into engagement with said type characters, and switch means responsive to the motion of said carrier plate for actuating said first and second locking means whereby said ring gear is unlocked and said carrier plate is locked with said printing roll in a printing position.

6. In a printing device, a frame, type characters mounted to the frame, a support for an article, a planet gear, a printing roller attached to said planet gear, a ring gear, a carrier plate for rotatably supporting said planet gear in mesh with said ring gear, a rotating sun gear in mesh with said planet gear, means for selectively locking said ring gear to permit said sun gear to rotate said carrier plate and planet gear about the sun gear to advance said printing roller from the type to the article, and means operated by the advance of said carrier plate for unlocking said ring gear and locking said plate to rotate said planet gear about its axis to advance said printing roller over said article.

7. In a device for printing on a cylindrical article, a printing roller, a set of type for engaging and impressing characters on said printing roller, means for advancing said printing roller from engagement with said set of type to a printing position, means actuated by said advancing means for locking said advancing means against further movement to locate said printing roller in the printing position, a group of rollers for rotatably supporting a cylindrical article in said printing position to be engaged by said printing roller, and means rendered effective by said locking of the advancing means for rotating said printing roller to print on and rotate said cylindrical article on said group of rollers.

8. An article printing mechanism which comprises a frame, an ink source mounted on said frame, printing type mounted on said frame, a driven shaft, a carrier plate mounted on the shaft, a rotating inking roll mounted on the carrier plate for transferring ink from the source to the printing type, a rotating printing roll mounted on the carrier plate for transferring an inked impression from the printing type to an article, means attached to said driven shaft for actuating the carrier plate to move said inking roll past the ink source and the type and to move the printing roll past the type and the article, and means for intermittently locking said plate against motion.

9. In an article printing mechanism, planetary gear means including a planetary gear and carrier means for supporting said gear; a source of marking material; mark impressing means; means mounted to the carrier means for conveying marking material from the source to the mark impressing means; transfer means mounted on said carrier means and receptive to an impression from the mark impressing means for marking an article, and driven sun gear means for rotating said planetary gear to advance the conveying and transfer means relative to said source, said mark impressing means, and said article.

10. A marking mechanism comprising a source of marking material, mark impressing means, means for conveying marking material from the source to the mark impressing means, transfer means for receiving an impression from the mark impressing means for marking an article, a carrier for advancing the conveying and transfer means, planetary gear means for advancing said carrier and moving the conveying and transfer means on said carrier relative to said source and said article, and means for selectively locking said carrier to effect said relative movement of said conveying and transfer means.

11. An article marking mechanism comprising a source of marking material; mark impressing means; means for conveying marking material form the source to the mark impressing means; transfer means for receiving a mark from the mark impressing means for marking an article;

a carrier for the conveying means and the transfer means; first planetary drive means mounted on the carrier for moving the conveying and transfer means relative to the carrier to receive marking material and to mark the article; means for selectively locking the carrier to effect said relative movement of the conveying and transfer means; and second planetary drive means for actuating the carrier and the first planetary drive means to advance the conveying means and the transfer means relative to the source, the mark impressing means, and the article.

References Cited in the file of this patent

UNITED STATES PATENTS

| | | |
|---|---|---|
| 857,331 | Cornwall | June 18, 1907 |
| 2,502,806 | Staude | Apr. 4, 1950 |
| 2,540,554 | Shurley | Feb. 6, 1951 |
| 2,542,063 | Tenety | Feb. 20, 1951 |
| 2,716,942 | Timson et al. | Sept. 6, 1955 |
| 2,813,479 | Roth | Nov. 19, 1957 |
| 2,909,117 | Crissy | Oct. 20, 1959 |
| 2,934,006 | Oberdoft et al. | Apr. 26, 1960 |